(12) United States Patent
Schmidt (10) Patent No.: US 9,491,524 B2
(45) Date of Patent: Nov. 8, 2016

(54) LEAP SECOND SUPPORT IN CONTENT TIMESTAMPS

(71) Applicant: Intel Corporation, Santa Clara, CA (US)

(72) Inventor: Johannes P. Schmidt, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 493 days.

(21) Appl. No.: 13/928,276

(22) Filed: Jun. 26, 2013

(65) Prior Publication Data

US 2014/0282791 A1    Sep. 18, 2014

Related U.S. Application Data

(60) Provisional application No. 61/780,799, filed on Mar. 13, 2013.

(51) Int. Cl.
*H04N 21/8547* (2011.01)

(52) U.S. Cl.
CPC ................. *H04N 21/8547* (2013.01)

(58) Field of Classification Search
CPC ..................................... H04J 3/0661
USPC ......................................... 713/502
See application file for complete search history.

(56) References Cited

U.S. PATENT DOCUMENTS 8,938,636 B1 *  1/2015  Hochschild .......... H04J 3/0661
                                                     709/248
2002/0120697 A1 *  8/2002  Generous ................ H04L 29/06
                                                     709/206
2010/0037081 A1 *  2/2010  Froehlich .................. G06F 1/14
                                                     713/502
2011/0238853 A1 *  9/2011  Paul .................... H04N 21/8133
                                                     709/231

OTHER PUBLICATIONS

Timeanddate.com: "The Future of Leap Seconds," Mar. 3, 2009, "http://www.timeanddate.com/time/leap-seconds-future.html" indicates that some scientists propose abolishing leap seconds in the future, redefining the way we measure time. This issue will be put to a vote in 2015.*

* cited by examiner

*Primary Examiner* — Kevin Bates
*Assistant Examiner* — Chen-Liang Huang
(74) *Attorney, Agent, or Firm* — Schwabe, Williamson & Wyatt, P.C.

(57) ABSTRACT

In embodiments, apparatuses, methods and storage media are described that are associated with support for leap seconds for provision of media content. In embodiments, a leap second is identified for a time during which media content may be timestamped. In embodiments, timestamps may be generated so that no segment of the media content contains a repeated timestamps and the media content is provisioned. In embodiments, content may be provisioned using a non-repeating time standard, such as TAI, and segments of media content maybe defined to have different lengths. In other embodiments, different time standards may be used, but seconds may be repeated across segment boundaries. Other embodiments may be described and/or claimed.

8 Claims, 7 Drawing Sheets

LEAP SECOND SUPPORT IN CONTENT TIMESTAMPS

RELATED APPLICATION

This application claims the benefit of U.S. Provisional Application No. 61/780,799. The specification of U.S. Provisional Application No. 61/780,799 is hereby incorporated by reference.

TECHNICAL FILED

The present disclosure relates to the field of data processing, in particular, to apparatuses, methods and storage media associated with handling leap seconds in content timestamps.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. Today, myriad content may be made available from various sources of content, including but not limited to fixed medium (e.g., Digital Versatile Disk (DVD)), broadcast, cable operators, satellite channels, Internet, and so forth. In some circumstances, content may include timestamps; these timestamps may, at times, be affected by leap seconds.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
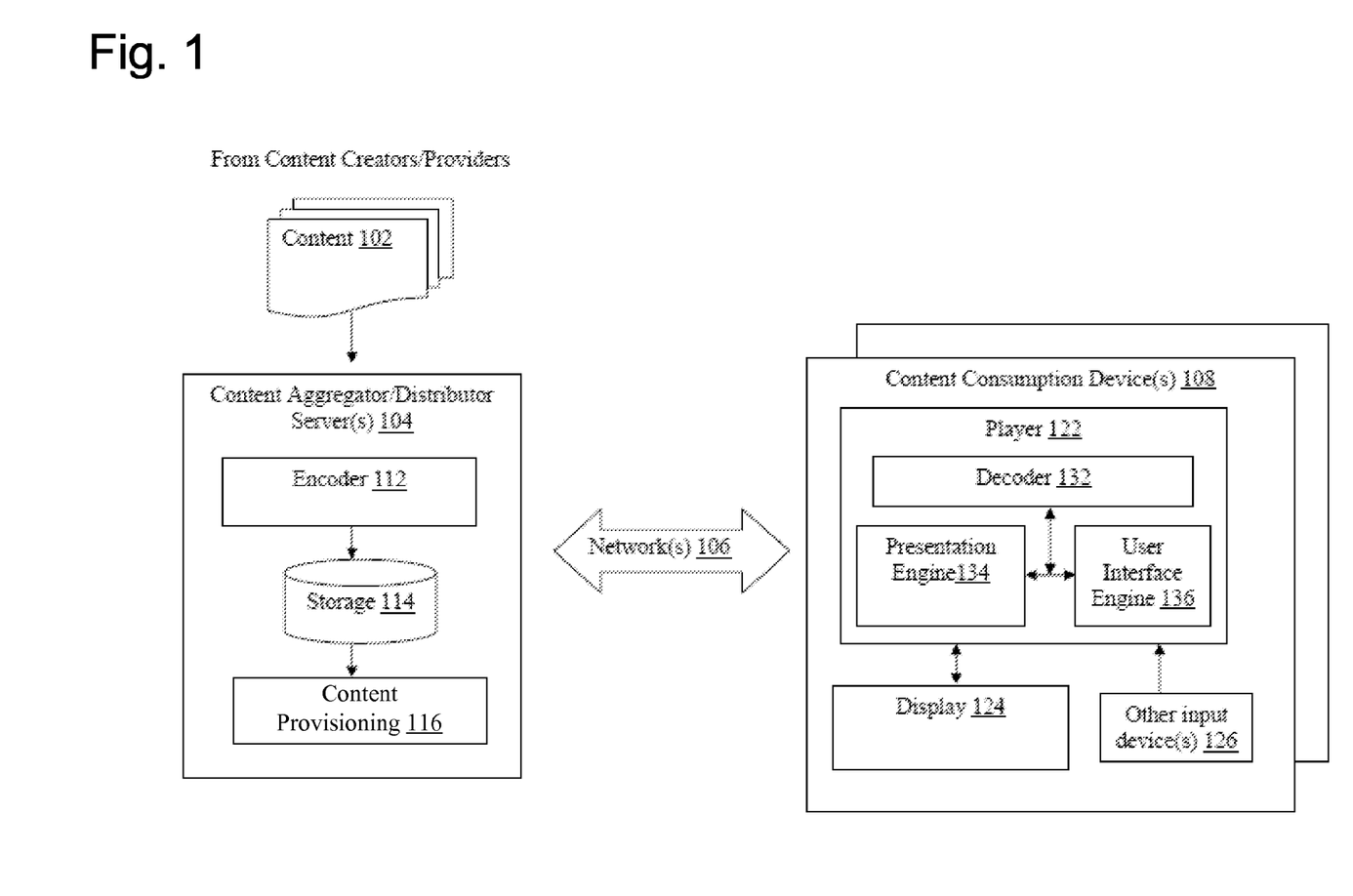
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Figure 2:
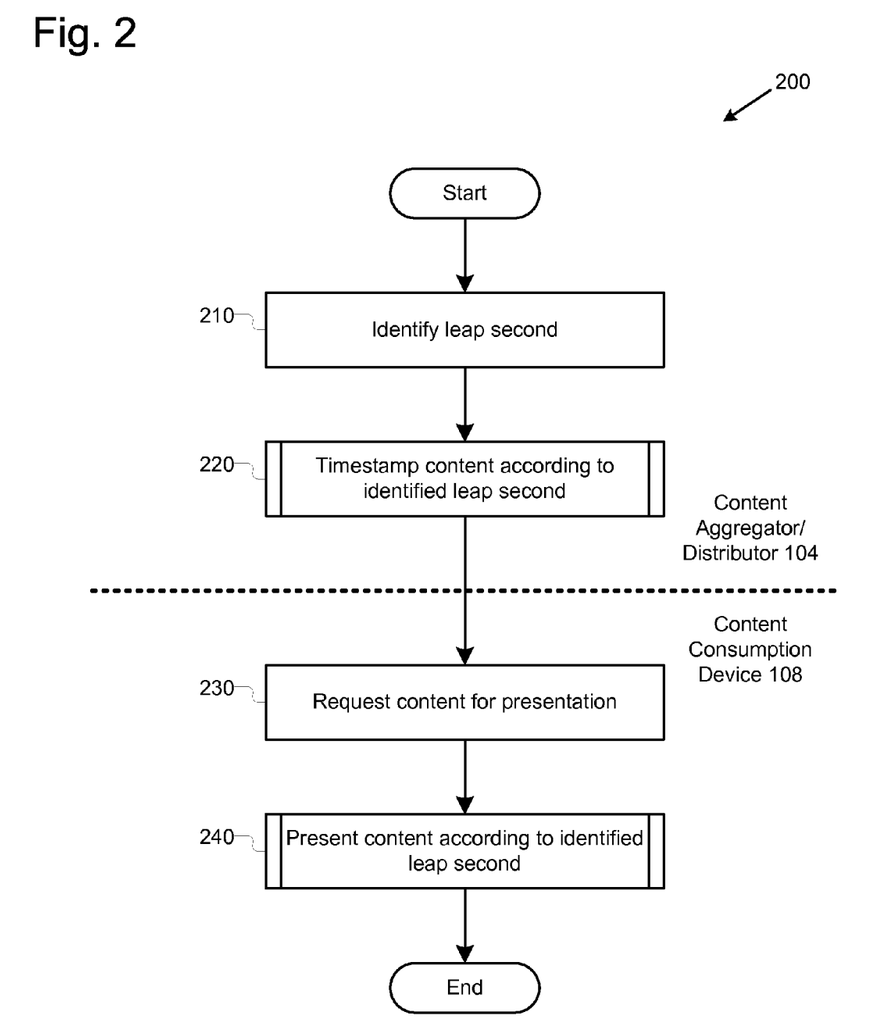
FIG. 2 illustrates an example process for handling leap seconds in content provisioning and presentation, in accordance with various embodiments.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, MPEG-DASH. Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, content provisioning 116 may include a transpackager, such as illustrated in FIG. 2 below, which may be configured to package content files encoded by the encoder 112 in one or more output packaging formats for subsequent provisioning. Particular embodiments of transpackagers and transpackaging may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be standalone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control, gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Referring now to FIG. 2, an example process 200 for handling leap seconds in content provisioning and presentation is illustrated in accordance with various embodiments. In various embodiments, leap seconds may be added to time standards in order to account for changes in the rotation of the earth that would lead to a lack of synchronization between the time standards and the mean solar time. One such time standard is Coordinated Universal Time (also known as "UTC"). UTC may be utilized, in various embodiments, in timestamps for content. In particular, content that follows the MPEG-DASH standard is specified to follow UTC time for live streaming content.

In various embodiments, UTC may provide for leap seconds by repeating or adding a second. For example, if a leap second were to be added at midnight in the morning of Jan. 1, 2014, a UTC clock may count the second at 00:00:00 on 1/1/14 twice before continuing on to 00:00:01. In other implementations, UTC may add a second specified as 23:59:60 immediately after 23:59:59 on 12/31/13 in order to account for the leap second.

However, this added leap second may, if not handled correctly, cause presentation of content to perform unpredictably or to fail. For example if content is seeked to a timestamp of 00:00:00 in the first scenario listed above, it may be unclear to presentation software which frame is supposed to be seeked to. In the second scenario above, presentation software may not contemplate the existence of a 23:59:60 second, as these are relatively uncommon. In another example, video decoders (both in hardware and software) may seldom contemplate times jumping backwards by one second; such time change may result frozen video or in skipped frames. Additionally, leap seconds are not predictable, as they are created when needed and may be announced only three to six months in advance of their usage.

Thus, in various embodiments, process 200 may facilitate the handling of a leap second at the time of the leap second when putting timestamps on frames of content, and for handling frames stamped with leap seconds during presentation. In various embodiments, the operations described in process 200 may be combined, split into additional operations, and/or omitted.

In various embodiments, process 200 may include a mechanism for stamping frames using UTC. In other embodiments, process 200 may include a mechanism for stamping frames using the International Atomic Time (also known as "TAI") standard. In various embodiments, TAI may account for leap seconds in a different manner than UTC. For example, while UTC may assume that every day is 86400 seconds long (i.e. 60*60*24), which leads to the jumping back of a second described above, in TAI a day may not be assumed to be exactly 86400 seconds long. Indeed, in TAI, a day with a leap second may be 86401 seconds long. Process 200 may begin at operation 210, where, in various embodiments, the content aggregator/distributor 104 may identify a leap second that is scheduled for a time during which content may be timestamped. In various embodiments, at operation 210, the content aggregator/distributor 104 may receive an indication, such as from a time standard body, that a leap second will occur on a particular schedule. Next, at operation 220, the content aggregator/distributor 104 may timestamp content according to the identified leap second. In various embodiments, at operation 220, content may be timestamped according to a time standard, such as TAI or UTC. Particular implementations of operation 220 are described below with reference to process 300 of FIG. 3 and process 400 of FIG. 4.

Next, at operation 230, the content consumption device 108 may request the content that was timestamped at operation 220 for presentation. In various embodiments, this request may take place before, after, or concurrently with the timestamping of operation 220. For example, in various embodiments, the content may include streamed content, which may be timestamped as it occurs and which may have been requested before the leap second is included in timestamps for the content. In other implementations, the leap second timestamp(s) may occur with content that is saved for later provisioning and presentation, and thus the request may occur after the timestamping of operation 220. Next, at operation 240, the content consumption device 108 may present the timestamped content according to the identified leap second. In various embodiments, if the TAI standard is used for timestamping content, then at operation 240 seeking and presentation of content may be performed with reference to TAI times, as may be understood. In embodiments where UTC is utilized for timestamping, additional operations may be performed as part of operation 240. Particular implementations of operation 240 for UTC timestamps are described below with reference to process 500 of FIG. 5. The process may then end.

Figure 3:
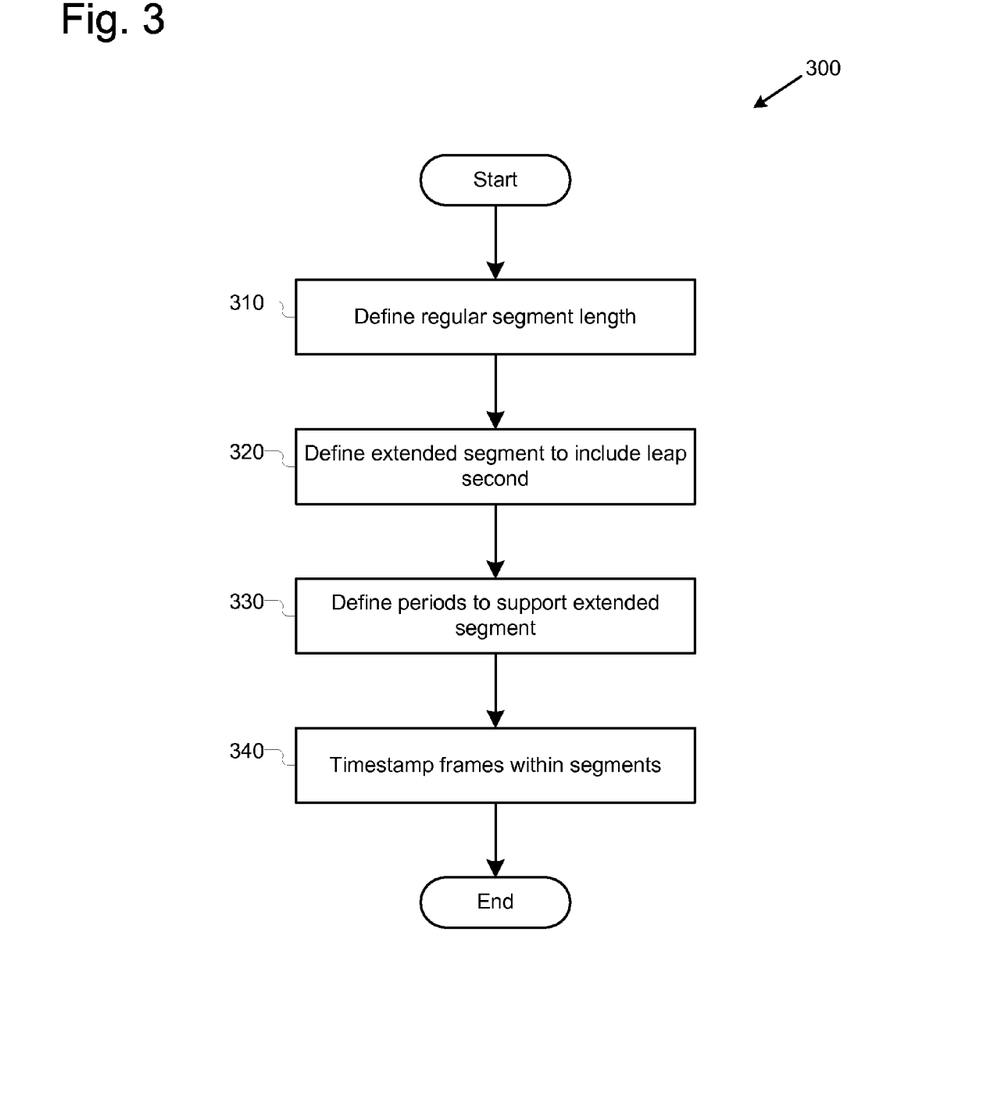
FIG. 3 illustrates an example process for including timestamps using the International Atomic Time standard, in accordance with various embodiments.

Referring now to FIG. 3, an example process 300 for including timestamps using an TAI standard in content is illustrated in accordance with various embodiments. In various embodiments, process 300 may perform one or more implementations of operation 220 of process 200 for embodiments which utilize the TAI standard for timestamping content. As discussed above, TAI may not account for leap seconds. Thus, TAI may continue to count time continuously using 60-second minutes regardless of whether any leap seconds have been defined, and, no seconds may be repeated.

Process 300 may be performed, however, to account for the use of segments of content and to maintain segments as falling on boundaries. For example, in various embodiments, content may be divided, for the most part, into segments of a 4-second length. In various embodiments, the segment length identified in operation 310 may be chosen to be a divisor of 60, which may allow segment boundaries to fall on these minute boundaries. This may aid in certain presentation tasks, such as seeking to an exact minute or hour boundary.

Because leap seconds may be scheduled to fall on minute boundaries, this, in turn, may allow leap seconds to fall on segment boundaries. However, because leap seconds are used to add a second, a continued use of the same segment length may cause segments to shift with respect to minute boundaries. For example, for a leap second repetition of the :00 second, segments could shift from falling on :00, :04, :08, . . . to :00, :03, :07, :11, . . . , :59. Process 300 may thus be performed to account for the leap second and to maintain segments as falling on minute boundaries. In various embodiments, the operations described in process 300 may be combined, split into additional operations, and/or omitted.

The process may begin at operation 310, where a regular segment length for content segments may be defined. In the example described above, this segment length may be 4 seconds. Next, at operation 320, an extended segment may be defined to include the leap second. Thus, single segments may be defined to include 5 seconds to include the leap second. This extended segment may allow the following segments (which would be of 4-second length) to fall back on the correct 4-second boundaries.

Next, at operation 330, periods may be defined to support the extended segment. For example, in various embodiments, the MPEG-DASH standard supports the definition of time-based periods, each of which may define a different segment length. Thus, in various embodiments, at operation 330 three periods may be defined, one for regular-length segments before the extended segment, one for the extended segment itself, and one for regular-length segments after the extended segment.

As an example, to handle the leap second that occurred on Jun. 30, 2012, the following periods could be defined:
Period 1—from a start time to 2012-06-30 23:23:56, with each segment being 4 seconds long;

Period 2—from 2012-06-30 23:23:56 to 2012-07-01 00:00:00, with a single 5-second segment; and Period 3—from 2012-07-01 00:00:00 to an end time, with each segment being 4 seconds long.

After defining periods at operation 330, at operation 340, the frames within the defined segments may be timestamped according to the TAI standard. The process may then end.

Figure 4:
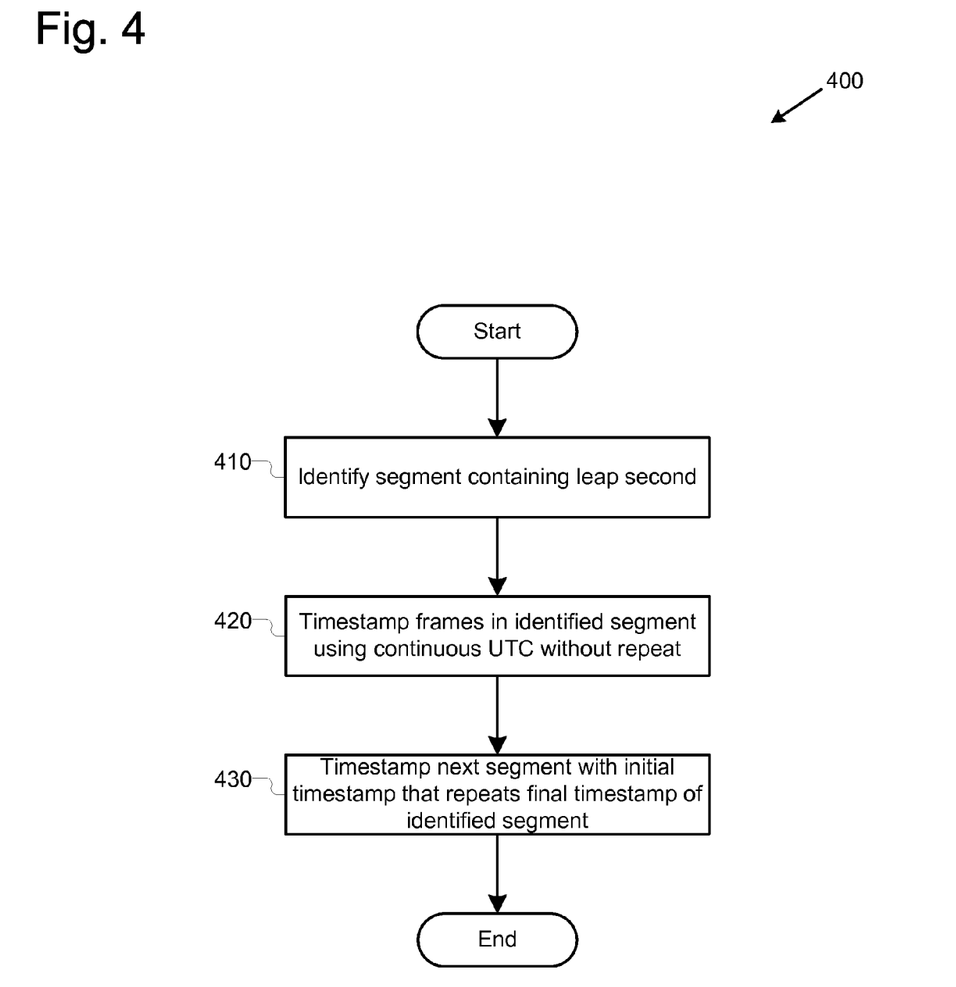
FIG. 4 illustrates an example process for including timestamps using the Coordinated Universal Time standard, in accordance with various embodiments.

FIG. 4 illustrates an example process for including timestamps using the UTC time standard, in accordance with various embodiments. In various embodiments, process 400 may perform one or more implementations of operation 220 of process 200 for embodiments which utilize the UTC standard for timestamping content. In various embodiments, because UTC includes repeating a second, the use of UTC will not cause a shift in where segment boundaries fall. Instead, however the repeated second may cause problems, as discussed above. To address this process 400 may shift leap seconds to segment boundaries to avoid repeated seconds within a segment. Thus, process 400 may be performed to allow for usage of UTC, which is required by the MPEG-DASH standard, while avoiding the problem of timestamps within a segment that repeat a second. In various embodiments, the operations described in process 400 may be combined, split into additional operations, and/or omitted.

The process may begin at operation 410, where the segment containing the leap second may be identified. This segment may have a repeated second. Thus, for example, given example UTC times of 8 to 19, including a leap second at time 15, a series of segments that includes a leap second may appear as follows:

(8 9 10 11) (12 13 14 15 15) (16 17 18 19)

Thus, at operation 410, the second of these segments may be identified as containing the leap second. Next, at operation 420, the frames of this segment may be timestamped to contain continuous UTC times without repeat. Then, at operation 430, the following segment may be timestamped such that the initial time repeats the final time of the identified segment. In the example provided above, the segments would be timestamped with the following times:

(8 9 10 11) (12 13 14 15 16) (16 17 18 19)

Thus, by performing process 400, the resulting segments contain timestamps with repeated times, but no time is repeated within a segment. The process may then end.

Figure 5:
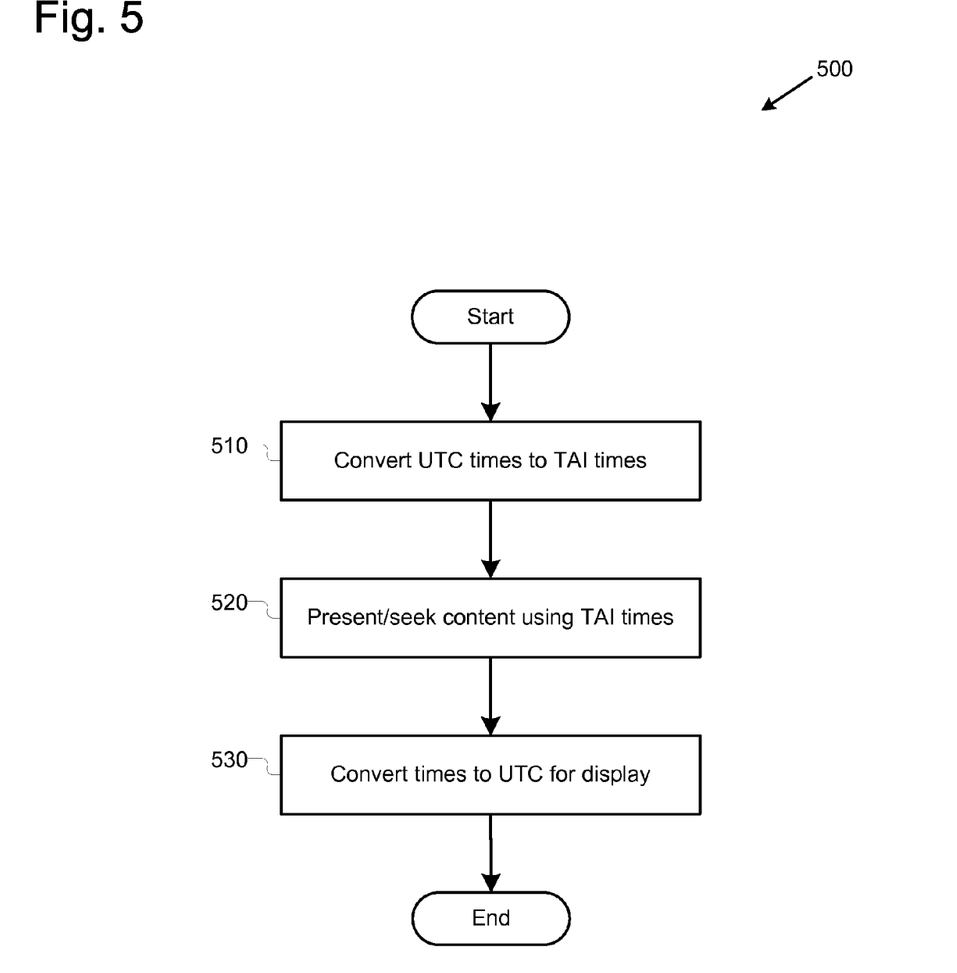
FIG. 5 illustrates an example process for handling Coordinated Universal Time timestamps during content presentation, in accordance with various embodiments.

Referring now to FIG. 5, an example process 500 for handling UTC timestamps during content presentation is illustrated in accordance with various embodiments. In various embodiments, process 500 may perform one or more implementations of operation 240 of process 200. In various embodiments, the operations described in process 400 may be combined, split into additional operations, and/or omitted.

The process may begin at operation 510, where the timestamps based on UTC times may be converted to use TAI times. This may allow for presentation, seeking, and other actions based on non-repeating TAI times rather than UTC times, which may contain a leap second repeat. Thus, for example, at operation 510, the UTC times discussed above may be converted to the following example TAI times (50 51 52 53) (54 55 56 57 58) (59 60 61 62)

In various embodiments, times may be converted between UTC and TAI (and vise versa) by known techniques, including the use of leap second tables. Next, at operation 520, the content may be presented and/or seeks may be performed using TAI times. At operation 530, if times are to be displayed to a user, they may be converted back to UTC times before display. By performing the conversion to TAI times at presentation time, embodiments described herein may provide for the provisioning of content according to the MPEG-DASH standard, which utilizes UTC, without requiring handling of repeated seconds during presentation. The process may then end.

Figure 6:
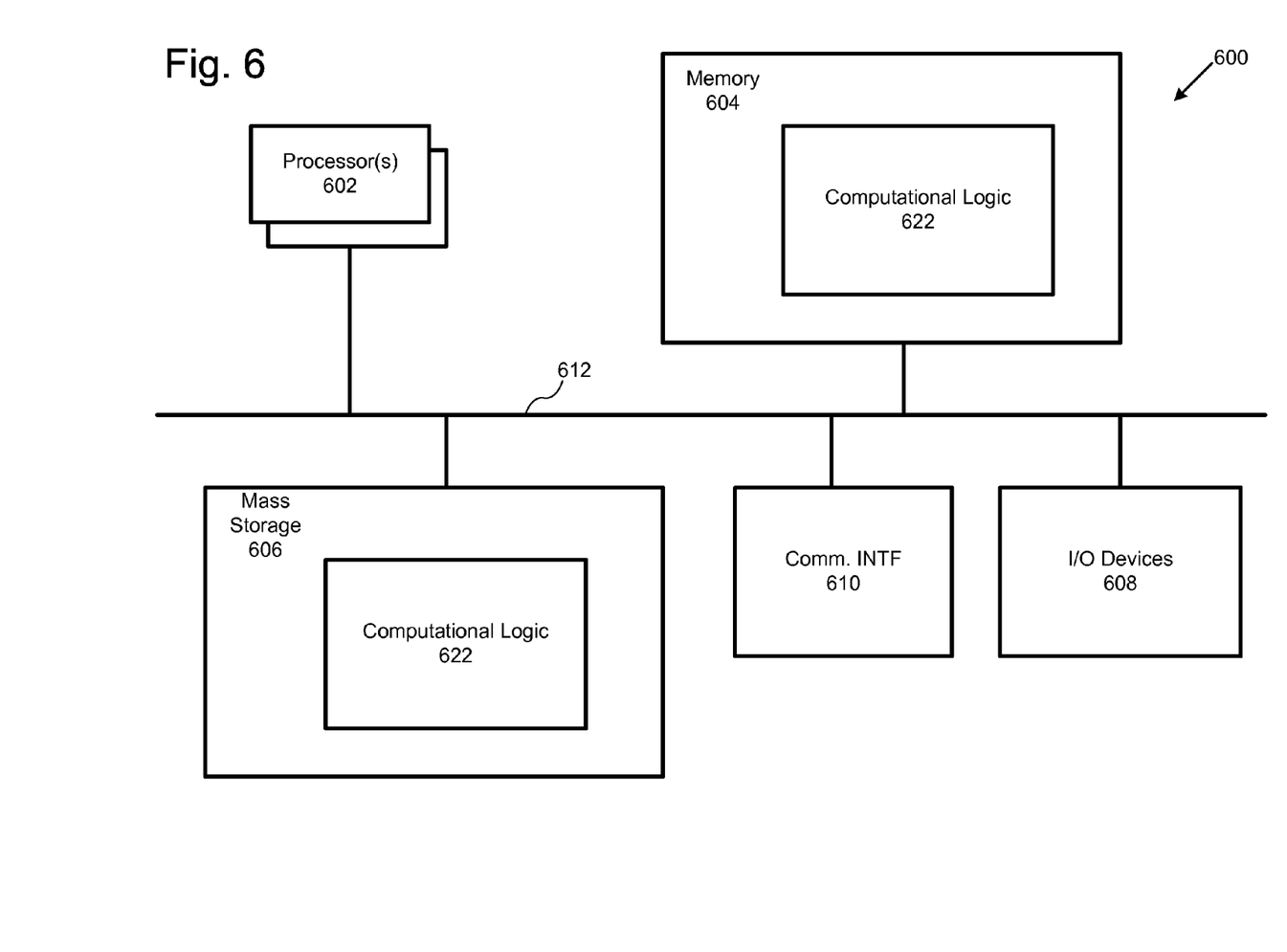
FIG. 6 illustrates an example computing environment suitable for practicing various aspects of the present disclosure, in accordance with various embodiments.

Referring now to FIG. 6, an example computer suitable for use for various components and processes of FIGS. 1-5 is illustrated in accordance with various embodiments. In embodiments, the computer 600 may be suitable for use as a stationary or mobile computing device. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content aggregator/distributor 104 and/or content consumption device 108, e.g., operations shown in FIGS. 2-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108 (e.g., a player 122), whether the content consumption device 108 is a stationary or mobile device, like a smartphone, computing tablet, ultrabook or laptop. Their constitutions are otherwise known, and accordingly will not be further described.

Figure 7:
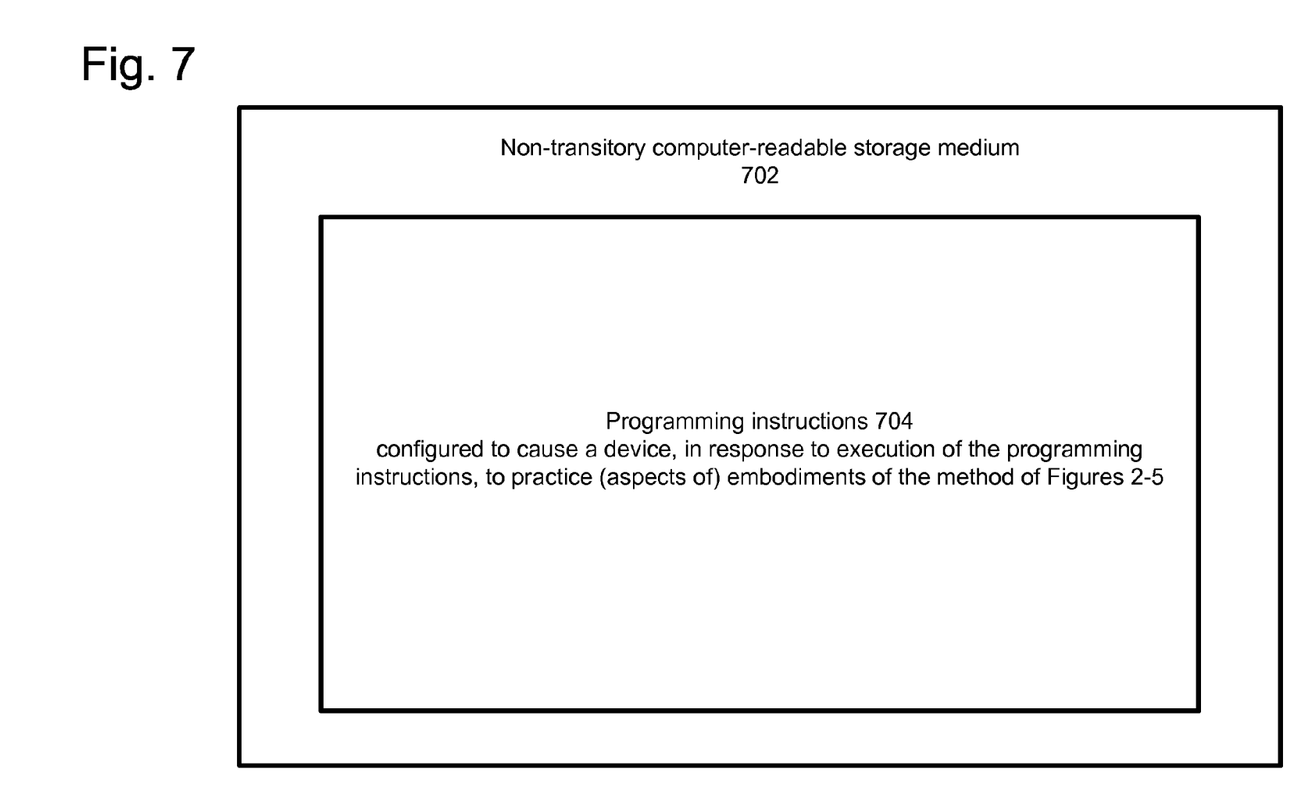
FIG. 7 illustrates an example storage medium with instructions configured to enable an apparatus to practice various aspects of the present disclosure, in accordance with various embodiments.

FIG. 7 illustrates an example at least one computer-readable storage medium 702 having instructions configured to practice all or selected ones of the operations associated with content consumption devices 108, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 2-5, e.g., but not limited to, to the various operations performed to perform transpackaging of encoded content to generate output content 250. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 2-5. For one embodiment, at least one of processors 602 may be packaged together with computational logic 622 configured to practice aspects of processes of FIGS. 2-5 to form a System in Package (SiP). For one embodiment, at least one of processors 602 may be integrated on the same die with computational logic 622 configured to practice aspects of processes of FIGS. 2-5. For one embodiment, at least one of processors 602 may be packaged together with computational logic 622 configured to practice aspects of processes of FIGS. 2-5 to form a System on Chip (SoC). For at least one embodiment, the SoC may be utilized in, e.g., but not limited to, a computing tablet.

The following paragraphs describe examples of various embodiments.

Example 1 may include one or more computer-readable media including instructions which, in response to execution on a computing device, cause the computing device to support leap seconds for provision of media content. The instructions may cause the computing device to identify, for the media content, a leap second that is scheduled for a time during which the media content will be timestamped. The instructions may further cause the computing device to generate timestamps for the media content such that no segment of the media content contains a repeated timestamp. The instructions may further cause the computing device to provision the media content including the generated timestamps.

Example 2 may include the one or more computer-readable media of example 1, wherein generate timestamps includes generate timestamps using a time standard that is configured to not repeat seconds when the leap second occurs.

Example 3 may include the one or more computer-readable media of example 2, wherein generate timestamp includes identify a segment of media content that are to be timestamped with the time scheduled for the leap second; define other segments of media content that precede and follow the identified segment to have a first time length; define the identified segment to have a second time length that is longer than the first time length; and generate the timestamps according to the defined segments.

Example 4 may include the one or more computer-readable media of example 3, wherein generate timestamps further includes define a period for the identified segment that defines segments as having the second time length.

Example 5 may include the one or more computer-readable media of example 4, wherein generate timestamps further includes define one or more periods for the other segments that defines segments as having the first time length.

Example 6 may include the one or more computer-readable media of any of examples 2-5, wherein the time standard is International Atomic Time.

Example 7 may include the one or more computer-readable media of example 1, wherein generate timestamps includes generate timestamps using a time standard that repeats seconds when the leap second occurs.

Example 8 may include the one or more computer-readable media of example 7, wherein generate timestamps includes identify a segment of media content that is to be timestamped with a repeated second according to the scheduled leap second and generate timestamps for the identified segment and a following segment such that a repeated second occurs across a segment boundary.

Example 9 may include the one or more computer-readable media of example 8, wherein generate timestamps further includes generate timestamps in the identified segment to be consecutive; and generate timestamps for the following segment such that timestamps for a first second of the following segment repeat a last second of the identified segment.

Example 10 may include the one or more computer-readable media of any of examples 7-9, wherein the time standard is Coordinated Universal Time.

Example 11 may include a computer-implemented method for supporting leap seconds for provisioning of media content. The method may include identifying, by a computing device, a leap second that is scheduled for a time during which the media content will be timestamped; generating, by the computing device, timestamps for the media content such that no segment of the media content contains a repeated timestamp; and provisioning, by the computing device, the media content including the generated timestamps.

Example 12 may include the method of example 11, wherein generating timestamps includes generating timestamps using a time standard that is configured to not repeat seconds when the leap second occurs.

Example 13 may include the method of example 12, wherein generating timestamps includes: identifying a segment of media content that are to be timestamped with the time scheduled for the leap second; defining other segments of media content that precede and follow the identified segment to have a first time length; defining the identified segment to have a second time length that is longer than the first time length; and generating the timestamps according to the defined segments.

Example 14 may include the method of example 13, wherein generating timestamps further includes defining a period for the identified segment that defines segments as having the second time length.

Example 15 may include the method of example 14, wherein generating timestamps further includes defining one or more periods for the other segments that defines segments as having the first' time length.

Example 16 may include the method of any of examples 12-15, wherein the time standard is International Atomic Time.

Example 17 may include the method of example 11, wherein generating timestamps includes generating timestamps using a time standard that repeats seconds when the leap second occurs.

Example 18 may include the method of example 17, wherein generating timestamps includes: identifying a segment of media content that is to be timestamped with a repeated second according to the scheduled leap second; and generating timestamps for the identified segment and a following segment such that a repeated second occurs across a segment boundary.

Example 19 may include the method of example 18, wherein generating timestamps further includes: generating timestamps in the identified segment to be consecutive; and generating timestamps for the following segment such that timestamps for a first second of the following segment repeat a last second of the identified segment.

Example 20 may include the method of any of examples 17-19, wherein the time standard is Coordinated Universal Time.

Example 21 may include an apparatus for supporting leap seconds for provision of media content. The apparatus may include one or more computing processors; and one or more modules configured to execute on the one or more computing processors. The one or more modules may be configured to execute to identify, for the media content, a leap second that is scheduled for a time during which the media content will be timestamped; generate timestamps for the media content such that no segment of the media content contains a repeated timestamp; and provision the media content including the generated timestamps.

Example 22 may include the apparatus of example 21, wherein generate timestamps includes generate timestamps using a time standard that is configured to not repeat seconds when the leap second occurs.

Example 23 may include the apparatus of example 22, wherein generate timestamps includes: identify a segment of media content that are to be timestamped with the time scheduled for the leap second; define other segments of media content that precede and follow the identified segment to have a first time length; define the identified segment to have a second time length that is longer than the first time length; and generate the timestamps according to the defined segments.

Example 24 may include the apparatus of example 23, wherein generate timestamps further includes define a period for the identified segment that defines segments as having the second time length.

Example 25 may include the apparatus of example 24, wherein generate timestamps further includes define one or more periods for the other segments that defines segments as having the first' time length.

Example 26 may include the apparatus of any of examples 22-25, wherein the time standard is International Atomic Time.

Example 27 may include the apparatus of example 21, wherein generate timestamps includes generate timestamps using a time standard that repeats seconds when the leap second occurs.

Example 28 may include the apparatus of example 27, wherein generate timestamps includes: identify a segment of media content that is to be timestamped with a repeated second according to the scheduled leap second; and generate timestamps for the identified segment and a following segment such that a repeated second occurs across a segment boundary.

Example 29 may include the apparatus of example 28, wherein generate timestamps further includes: generate timestamps in the identified segment to be consecutive; and generate timestamps for the following segment such that timestamps for a first second of the following segment repeat a last second of the identified segment.

Example 30 may include the apparatus of any of examples 27-29, wherein the time standard is Coordinated Universal Time.

Example 31 may include an apparatus for supporting leap seconds for provisioning of media content. The apparatus may include means for identifying a leap second that is scheduled for a time during which the media content will be timestamped; means for generating timestamps for the media content such that no segment of the media content contains a repeated timestamp; and means provisioning the media content including the generated timestamps.

Example 32 may include the apparatus of example 31, wherein means for generating timestamps includes means for generating timestamps using a time standard that is configured to not repeat seconds when the leap second occurs.

Example 33 may include the apparatus of example 32, wherein means for generating timestamps includes: means for identifying a segment of media content that are to be timestamped with the time scheduled for the leap second; means for defining other segments of media content that precede and follow the identified segment to have a first time length; means for defining the identified segment to have a second time length that is longer than the first time length; and means for generating the timestamps according to the defined segments.

Example 34 may include the apparatus of example 33, wherein means for generating timestamps further includes means for defining a period for the identified segment that defines segments as having the second time length.

Example 35 may include the apparatus of example 34, wherein means for generating timestamps further includes means for defining one or more periods for the other segments that defines segments as having the first time length.

Example 36 may include the apparatus of any of examples 32-35, wherein the time standard is International Atomic Time.

Example 37 may include the apparatus of example 31, wherein means for generating timestamps includes means for generating timestamps using a time standard that repeats seconds when the leap second occurs.

Example 38 may include the apparatus of example 37, wherein means for generating timestamps includes: means for identifying a segment of media content that is to be timestamped with a repeated second according to the scheduled leap second; and means for generating timestamps for the identified segment and a following segment such that a repeated second occurs across a segment boundary.

Example 39 may include the apparatus of example 38, wherein means for generating timestamps further includes: means for generating timestamps in the identified segment to be consecutive; and means for generating timestamps for the following segment such that timestamps for a first second of the following segment repeat a last second of the identified segment.

Example 40 may include the apparatus of any of examples 37-39, wherein the time standard is Coordinated Universal Time.

Example 41 may include one or more computer-readable media including instructions which, in response to execution on a computing device, cause the computing device to support leap seconds for presentation of a media content. The instructions may be configured to cause the computing device to: receive one or more segments for the media content, the segments containing first timestamps with a second that is repeated based on a leap second; convert the timestamps for the one or more segments to second timestamps using a first time standard that is configured to not repeat seconds; and present the one or more segments based on the second timestamps.

Example 42 may include the one or more computer-readable media of example 41, wherein the instructions are further configured to cause the computing device, in response to a request to display a time, to: convert one or more of the second timestamps to a second time standard that is configured to allow for repeated seconds; and display one or more times based on the converted timestamps.

Example 43 may include the one or more computer-readable media of any of examples 41 or 42, wherein the first time standard is International Atomic Time.

Example 44 may include the one or more computer-readable media of any of examples 41-43, wherein the second time standard is Coordinated Universal Time.

Example 45 may include a computer-implemented method for supporting leap seconds for presentation of media content. The method may include: receiving, by a computing device, one or more segments for the media content, the segments containing first timestamps with a second that is repeated based on a leap second; converting, by the computing device, the timestamps for the one or more segments to second timestamps using a first time standard that is configured to not repeat seconds; and presenting, by the computing device, the one or more segments based on the second timestamps.

Example 46 may include the method of example 45, further including, in response to a request to display a time: converting, by the computing device, one or more of the second timestamps to a second time standard that is configured to allow for repeated seconds; and displaying, by the computing device, one or more times based on the converted timestamps.

Example 47 may include the method of any of examples 45 or 46, wherein the first time standard is International Atomic Time.

Example 48 may include the method of any of examples 45-47, wherein the second time standard is Coordinated Universal Time.

Example 49 may include an apparatus for supporting leap seconds for presentation of a media content. The apparatus may include: one or more computing processors; and one or modules configured to execute on the one or more computing processors. The one or more modules may be configured to execute on the one or more computing processors to: receive one or more segments for the media content, the segments containing first timestamps with a second that is repeated based on a leap second; convert the timestamps for the one or more segments to second timestamps using a first time standard that is configured to not repeat seconds; and present the one or more segments based on the second timestamps.

Example 50 may include the apparatus of example 49, wherein the one or more modules are further configured to: convert one or more of the second timestamps to a second time standard that is configured to allow for repeated seconds; and display one or more times based on the converted timestamps.

Example 51 may include the apparatus of any of examples 49 or 50, wherein the first time standard is International Atomic Time.

Example 52 may include the apparatus of any of examples 49-51, wherein the second time standard is Coordinated Universal Time.

Example 53 may include an apparatus for supporting leap seconds for presentation of media content. The apparatus may include: means for receiving one or more segments for the media content, the segments containing first timestamps with a second that is repeated based on a leap second; means for converting the timestamps for the one or more segments to second timestamps using a first time standard that is configured to not repeat seconds; and means for presenting the one or more segments based on the second timestamps.

Example 54 may include the apparatus of example 53, further including: means for converting, in response to a request to display a time, one or more of the second timestamps to a second time standard that is configured to allow for repeated seconds; and means for displaying one or more times based on the converted timestamps.

Example 55 may include the apparatus of any of examples 53 or 54, wherein the first time standard is International Atomic Time.

Example 56 may include the apparatus of any of examples 53-55, wherein the second time standard is Coordinated Universal Time.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media including instructions which, in response to execution on a computing device for generating media content, cause the computing device to generate media content, wherein to generate media content, the computer device is caused to:
   identify, for a media content, a leap second that is scheduled for a time during which the media content will be timestamped;
   generate timestamps for the media content, including a timestamp associated with the leap second, using a time standard that is configured to not repeat seconds when the leap second occurs such that no segment of the media content contains a repeated timestamp, wherein generate timestamps comprises:
   identify a segment of the media content that is to be timestamped with the time scheduled for the leap second;
   define other segments of the media content that precede and follow the identified segment to have a first time length;
   define the identified segment to have a second time length that is longer than the first time length; and
   generate the timestamps according to the defined segments; and
   timestamp segments of the media content using the generated timestamps output the timestamped media content.

2. The one or more non-transitory computer-readable media of claim 1, wherein generate timestamps further comprises define a period for the identified segment that defines segments as having the second time length.

3. The one or more non-transitory computer-readable media of claim 2, wherein generate timestamps further comprises define one or more periods for the other segments that define segments as having the first time length.

4. The one or more non-transitory computer-readable media of claim 1, wherein the time standard is International Atomic Time.

5. A computer-implemented method for generating media content, the method comprising:
- identifying, by a computing device, a media content to be generated, and a leap second that is scheduled for a time during which the media content will be timestamped;
- generating, by the computing device, timestamps for the media content such that no segment of the media content contains a repeated timestamp, wherein generating timestamps comprises:
  - identifying a segment of media content that is to be timestamped with a repeated second according to the scheduled leap second; and
  - generating timestamps using Coordinate Universal Time for the identified segment and a following segment such that a repeated second occurs across a segment boundary;
- timestamping segments of the media content using the generated timestamps; and
- outputting, by the computing device, the timestamped media content.

6. The method of claim 5, wherein generating timestamps further comprises:
- generating timestamps in the identified segment to be consecutive; and
- generating timestamps for the following segment such that timestamps for a first second of the following segment repeat a last second of the identified segment.

7. An apparatus for generating media content, the apparatus comprising:
- one or more computing processors; and
- one or more software modules with instructions to execute on the one or more computing processors to generate the media content, wherein to generate the media content, the one or more modules are to:
  - identify, for a media content, a leap second that is scheduled for a time during which the media content will be timestamped;
  - generate timestamps for the media content such that no segment of the media content contains a repeated timestamp, wherein generate timestamps comprises:
    - identify a segment of the media content that is to be timestamped with the time scheduled for the leap second;
    - define other segments of the media content that precede and follow the identified segment to have a first time length;
    - define the identified segment to have a second time length that is longer than the first time length; and
    - generate the timestamps using International Atomic Time according to the defined segments;
  - timestamp segments of the media content using the generated timestamps; and
  - output the timestamped media content.

8. The apparatus of claim 7, wherein generate timestamps further comprises:
- define a period for the identified segment that defines segments as having the second time length; and
- define one or more periods for the other segments that defines segments as having the first time length.

* * * * *

UNITED STATES PATENT AND TRADEMARK OFFICE
CERTIFICATE OF CORRECTION

| | | |
|---|---|---|
| PATENT NO. | : 9,491,524 B2 | |
| APPLICATION NO. | : 13/928276 | |
| DATED | : November 8, 2016 | |
| INVENTOR(S) | : Johannes P. Schmidt | |

It is certified that error appears in the above-identified patent and that said Letters Patent is hereby corrected as shown below:

In the Claims

Column 14
Lines 53-56, Claim 1 "and; timestamp segments of the media content using the generated timestamps output the timestamped media content" should read -- timestamp segments of the media content using the generated timestamps; and output the timestamped media content --

Signed and Sealed this
Seventh Day of March, 2017

Michelle K. Lee
*Director of the United States Patent and Trademark Office*